Sept. 6, 1966 W. T. SELSTED ETAL 3,270,936

TAPE GUIDE FOR TAPE RECORDING AND REPRODUCING APPARATUS

Original Filed Nov. 29, 1963

INVENTORS
WALTER T. SELSTED
WILLIAM I. GIRDNER
BY Q. C. Smith

United States Patent Office 3,270,936
Patented Sept. 6, 1966

3,270,936
TAPE GUIDE FOR TAPE RECORDING AND REPRODUCING APPARATUS

Walter T. Selsted, Woodside, and William I. Girdner, Portola Valley, Calif., assignors to Hewlett-Packard Company, Palo Alto, Calif., a corporation of California Original application Nov. 29, 1963, Ser. No. 326,811. Divided and this application Sept. 29, 1965, Ser. No. 491,220
4 Claims. (Cl. 226—196)

This is a divisional application of our application Serial Number 326,811 entitled Tape Recording and Reproducing Apparatus, filed November 29, 1963.

This invention relates to improved tape recording and reproducing apparatus.

It is an object of the present invention to provide tape recording and reproducing apparatus which includes improved tape guides for easy, accurate threading of the tape.

Other and incidental objects of the present invention will be apparent from a reading of this specification and an inspection of the accompanying drawing in which.

Figure 1:
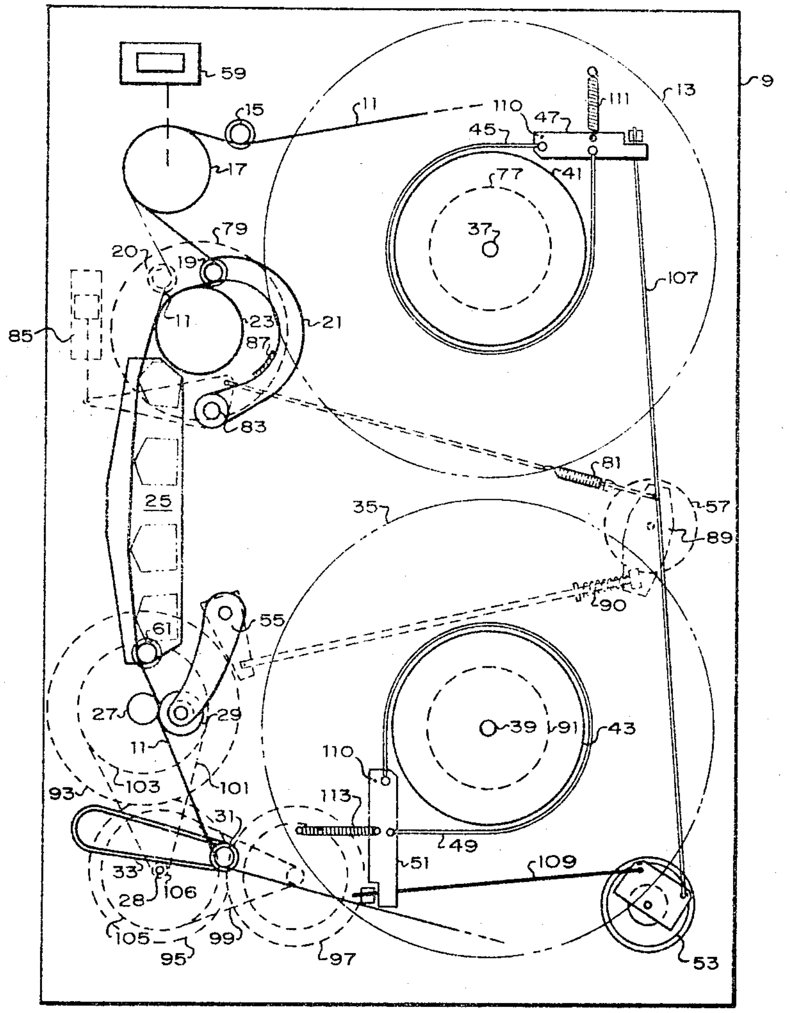
FIGURE 1 is a top view of the tape recording and reproducing apparatus showing the location of components on the base plate.

Referring now to FIGURE 1, the tape recording and reproducing apparatus is shown assembled on base plate 9. The tape 11 from supply reel 13 follows a path around guide 15, roller 17, guide 19 mounted on rotatable arm 21, the flywheel roller 23 and through the assembly of signal transducer heads 25. The tape 11 is pulled through this path by the capstan drive which includes the capstan shaft 27 and pinch roller 29. The tape 11 then follows the path around guide 31 mounted on rotatable arm 33 to the take-up reel 35.

Figure 2:
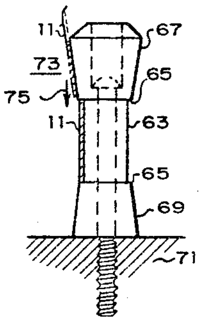
FIGURE 2 is a front view of a tape guide used in the tape recording and reproducing apparatus of the present invention.

Each of the tape guides 15, 19, 31, and optionally guide 61, have a shape similar to that shown in FIGURE 2. Each of these guides includes a first section 63 of narrow diameter having a shoulder 65 or abrupt change in diameter at the upper and lower ends of this section. The tape 11 shown in cross-section in FIGURE 2 thus slides against the section of narrow diameter 63 and is maintained in proper alignment between the upper and lower shoulders 65. Upper and lower tapered sections 67, 69 are formed as truncated cones with the truncate or smaller diameter disposed adjacent the section of narrow diameter 63. The tape guide is fastened to a supporting surface 71 to prevent rotation of the guide. Tape guides of this shape facilitate easy threading of tape through the present apparatus because they eliminate the need for critical hand alignment of the tape. If the tape becomes improperly positioned on the upper tapered section 67 of the guide as shown at 73, then a centering force 75 is exerted on the tape as the tape is pulled over the guide due to the taper of 67.

Similarly, if the tape becomes improperly positioned on the lower tapered section 69, a similar centering force attributable to the tapered section urges the tape 11 into proper position on the section of narrow diameter 63.

We claim:

1. A tape guide for tape transport apparatus comprising:
   a pair of frusto-conical sections and a non-rotatable cylindrical section having a diameter smaller than the truncate diameters of said frusto-conical sections and having a length substantially equal to the width of a tape;
   said cylindrical section being disposed between said pair of frusto-conical sections with the truncate diameters adjacent said cylindrical section and with the truncate surfaces of said frusto-conical sections forming outwardly extending shoulders for engaging the longitudinal edges of the tape.

2. In a tape transport a guide for tape comprising:
   a non-rotatable cylindrical section of selected radius for slidably engaging a tape, the length of the cylindrical section being substantially equal to the width of the tape;
   means forming an outwardly extending shoulder at one end of said cylindrical section for engaging one longitudinal edge of the tape;
   a frusto-conical section which has a truncate radius that is larger than said cylindrical radius and which is disposed at the other end of said cylindrical section with the truncate surface of the frusto-conical section forming an outwardly extending shoulder at said other end of the cylindrical section for engaging the opposite longitudinal edge of the tape.

3. A guide for tape as in claim 2 wherein:
   said means forming the outwardly extending shoulder at said one end of the cylindrical section is another frusto-conical section which has a truncate radius that is larger than said cylindrical radius and which is disposed with the truncate surface of the frusto-conical section forming said outwardly extending shoulder at said one end of the cylindrical section.

4. A guide for tape as in claim 2 wherein:
   the length of the side wall of the frusto-conical section is greater than at least half the length of the cylindrical section.

References Cited by the Examiner

UNITED STATES PATENTS

| | | | |
|---|---|---|---|
| 2,676,766 | 4/1954 | Ross et al. | 242—76 |
| 3,143,270 | 8/1964 | Cohen | 226—196 |

FOREIGN PATENTS

| | | |
|---|---|---|
| 884,192 | 8/1943 | France. |
| 109,926 | 2/1944 | Sweden. |

M. HENSON WOOD, Jr., *Primary Examiner.*

A. N. KNOWLES, *Assistant Examiner.*